(12) United States Patent
Davies et al.

(10) Patent No.: US 8,825,124 B1
(45) Date of Patent: Sep. 2, 2014

(54) INTERACTIVE PROTECTIVE SMART CASE WITH TOUCHSCREEN DISPLAY AND LASER POINTER FOR THE DISPLAY AND BROADCAST OF IMAGES, VIDEO, AND AUDIO RESPECTIVELY FROM A SMARTPHONE

(71) Applicants: Matthew P. Davies, Saint Johns, FL (US); David F. Campbell, Miami, FL (US)

(72) Inventors: Matthew P. Davies, Saint Johns, FL (US); David F. Campbell, Miami, FL (US)

( * ) Notice: Subject to any disclaimer, the term of this patent is extended or adjusted under 35 U.S.C. 154(b) by 26 days.

(21) Appl. No.: 13/867,131

(22) Filed: Apr. 22, 2013

(51) Int. Cl.
*H04M 1/00* (2006.01)
*H04B 1/38* (2006.01)
*H04M 1/02* (2006.01)

(52) U.S. Cl.
CPC ............ *H04B 1/3888* (2013.01); *H04B 1/3883* (2013.01); *H04M 1/0266* (2013.01); *H04M 1/0202* (2013.01); *H04B 1/385* (2013.01); *H04M 1/0279* (2013.01); *H04M 1/0283* (2013.01)
USPC .................... 455/575.8; 455/550.1; 455/558; 455/575.1

(58) Field of Classification Search
CPC ............ H04M 1/0283; H04M 1/0202; H04M 1/0279; H04B 1/388; H04B 1/385
USPC .......................... 455/558, 550.1, 575.1, 575.8
See application file for complete search history.

(56) References Cited

U.S. PATENT DOCUMENTS 8,428,644 B1 * 4/2013 Harooni ..................... 455/550.1

* cited by examiner

*Primary Examiner* — Khalid Shaheed

(57) ABSTRACT

A protective smart-case for the interactive display of images, video, and audio via a capacitive touchscreen, on-board high capacity neodymium speaker, and laser pointer within the case itself is presented. Said case mounted touchscreen serves to actively display images and video stored in case memory, external memory, through USB and/or receive images from said smartphone or other external operating system (OS). Said images may be static or cycle through as a screen saver. Further the present invention would alleviate the need to purchase multiple smartphone cases "skins", with printed pictures on the outer portion as the smart-case would be able to display any image or video and thus change any image as often as the user would desire. By utilizing the current protective smart-case the need for acquiring separate smartphone cases, peripheral laser pointer devices, and software programmable applications to extend the functionality of modern smartphone limitations may be avoided.

19 Claims, 4 Drawing Sheets

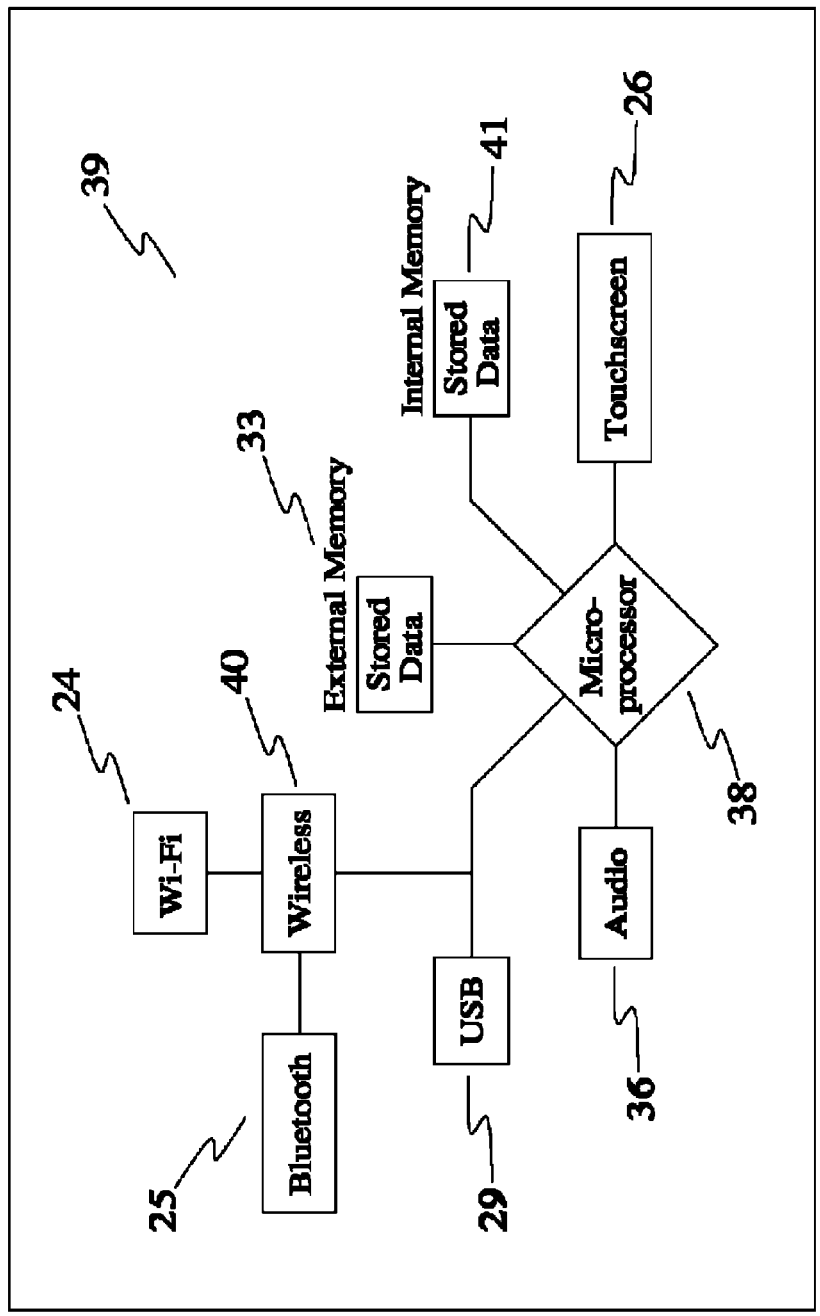

INTERACTIVE PROTECTIVE SMART CASE WITH TOUCHSCREEN DISPLAY AND LASER POINTER FOR THE DISPLAY AND BROADCAST OF IMAGES, VIDEO, AND AUDIO RESPECTIVELY FROM A SMARTPHONE

BACKGROUND OF INVENTION

1. Field of Invention

The technology described in the disclosed patent document relates generally to the field of touchscreen cell phone cases for the protection and interaction with and of smartphones.

2. Discussion: (Background)

Smartphones have become an integral part of modern society by combining a multitude of formerly independent devices into a single architecture. Examples of this are the combination of a standard cell phone with the functionality of a MP3 player, the ability to check email, send text messages, view calendars, etc. Smartphones do however still have limitations, mainly a fragile LCD display susceptible to cracking, as well as battery and processing power limitations. To overcome these limitations various add-on type peripheral devices have been constructed that interact with a smartphone to extend the inherent functionality of the phone.

One such device is a plastic case with a rubber lining to protect the smartphone from damage in the event the user drops the phone. In this situation the phone generally impacts the ground at a corner or the face of the LCD screen causing a crack. When a protective case is employed, the case absorbs some or all of the force, preventing damage to the phone. Today's consumers have a wide variety of cases to choose from that come in various sizes, shapes, colors, and even those with fixed images printed on the outer surface.

A second such device to overcome various limitations is a presentation type audio jack plug-in laser pointer. The dockable laser pointer electronically couples with the audio jack of a smartphone to project a laser dot on a screen for use during a presentation. The smartphone then couples with an external computer operating system (OS) wirelessly to allow the phone to instruct the computer to move to the next slide in the presentation through a software based application "app" installed on the phone OS. Several drawbacks exist with this approach, namely the audio jack plug-in laser pointer adapter is a separate component from the phone, a software based application must be acquired and installed on the phone to enable the functionality to advance the next slide in a presentation, and finally once the system (audio jack plug-in laser pointer and app) is engaged, the screen of the smartphone is frozen and serves no useful purpose thereby not allowing the user to view where the mouse is on the screen. Lastly, this type of laser system is not self powered but rather draws power for the smartphone, consuming power and decreasing battery life in the process.

One solution to these drawbacks in the present invention is a protective smartphone case that electronically couples, either directly or wirelessly, to a smartphone, and contains a self enclosed touchscreen display for the display of images and video either from an internal loadable memory, external memory, USB, or by wireless transfer from the smartphone. Further, said protective smart case incorporates a dual onboard wireless technology and laser pointer. This is useful in many ways for the display of images as a static "skin", to cycle through a series of images as a screen saver, as a means to play video, sound, edit pictures, or finally as a means to view a presentation on the smartphone case while simultaneously using the integrated case laser and dual onboard wireless to couple to an external OS to advance slides in a presentation while still retaining the ability to see where a mouse pointer is on the case touchscreen. This is useful as the smartphone case contains two separate wireless units or network interfaces (Bluetooth and Wi-Fi for example), which respectively couple to the smartphone OS and an external OS. The first onboard wireless unit employs a Bluetooth communication protocol architecture to control the mouse and laser pointer. As the data rate for communication, from the smart case OS to the external OS, is not large for controlling a mouse, a high throughput is not necessary. Whereas the throughput for data going to and from the LCD screen is much greater and a Wi-Fi connection is needed to prevent a system overload. As such, the second onboard wireless unit (controller) employs a Wi-Fi architecture, for example, and controls the images and video to the smart case LCD screen. The use of dual onboard wireless controllers allows for fast communication of the smart case with both a smartphone and an external OS and high throughput data transfer.

The present invention would alleviate the need to purchase multiple smartphone or cell phone cases with printed pictures on the outer portion or "skin", as the smart case would be able to display any image the user chooses and thus change any image as often as the user would desire. Additionally, the image cycling screen saver aspect of the invention is useful over currently available smartphone screen savers as the phone OS will time out and shut the screen off after a predefined period of time so as to preserve battery power. The smart case, having an onboard battery not tied to the phones battery would run independently of the phone OS and not shutdown when the phone OS times out. Further still, the user would be able to take a picture with said smartphone and transfer said image from the phone OS to the smart case OS for instant display of said image on the smart case. The same would be true for video.

Said protective smart case is formed from hardened plastic with a rubberized coating and designed to house a smartphone wherein said case mounted touchscreen serves to actively display images and video stored in the case memory and/or receive images and/or video from said smartphone for display. The smart case may also receive data from a USB port or an external micro-device card reader. Said case can also be used to edit, crop, or otherwise modify images and video through the case mounted touchscreen. Lastly, said protective smart case has a rechargeable battery such that when the smart case is plugged in the charging circuit both recharges the case as well as the smartphone battery. The case may also be powered through the USB port analogous to the charging circuit to either power the device and/or charge the case battery.

The invention components consists of a hardened plastic case with a rubberized coating, electrical connector (thirty pin or equivalent), dual wireless connectors, capacitive LCD touchscreen, laser pointer, battery, speaker, memory, processing function to perform operations of receiving and transferring data to and from a smartphone to the LCD screen and a speaker. The case will further comprise a mini USB data port, a recharging power port to plug in for recharging, a micro-device or SD type memory reader, and an infrared (IR) LED. The invention is designed to electronically couple to a smartphone that is housed within the case.

The coupling of the case to a smartphone may come through a physical electronic connector, either 3.5 mm TRRS (RJ11) connector or 30-pin, a USB connection, through IR, or through a RF wireless technology such as Bluetooth, TransferJet, UWB, or Wi-Fi. In the present embodiment of the invention Bluetooth and Wi-Fi protocols are used. Specifically Bluetooth 2.0+EDR, 2.1+EDR, v3.0+HS, or Bluetooth v4.0 may be used to work in conjunction with the smartphones Wi-Fi capability.

It is foreseeable that the current invention may be adapted to fit a tablet as well as a smartphone by simply modifying the dimensions of the device.

SUMMARY OF INVENTION

In accordance with the teachings of this invention as embodied and described herein, systems are provided for a means to couple a smartphone to a protective smart case for the interactive display of images and video via a capacitive touchscreen within the case itself as well as audio through an on-board high capacity neodymium speaker. Said case mounted touchscreen serves to actively display images and video stored in the case memory, external memory, through USB and/or receive images from said smartphone or other external operating system (OS) for display. Said images may be static or cycle through a series of images as a screen saver. The image cycling screen saver aspect of the invention is useful over currently available smartphone screen savers as the phone OS will time out and shut the screen off after a predefined period of time so as to preserve the phone battery power. Further the present invention would alleviate the need to purchase multiple smartphone or cell phone cases with printed pictures on the outer portion as the smart case would be able to display any image or video and thus change any image as often as the user would desire. Further still the user would be able to take a picture or video with their smartphone and transfer said image or video from the phone OS to the smart case OS for instant display of said image on the smart case. The user would also have the ability to transfer music files to the case OS for broadcast over the on-board high capacity speaker either in sequence with the smartphone speaker(s) or alone.

Additionally, the case formed of hardened plastic with a rubber coating to protect the enclosed smartphone, incorporates a first onboard wireless network interface to communicably couple to an external (computer and/or external wireless device) OS via a Bluetooth communication protocol architecture for the transfer of data to and from said external OS to effect the motion of a mouse pointer in conjunction with the onboard case laser. Further, said protective smart case incorporates a second onboard wireless network interface to communicably couple to an external (smartphone and/or external wireless device) OS via a Wi-Fi communication protocol architecture for the transfer of high throughput data to and from said external OS for the display and broadcast of images, video, and audio data on the touchscreen and speaker respectively. The case may also transmit and receive SMS data through the wireless network interface using standardized communication protocols. Lastly, said protective smart case has a rechargeable battery such that when the smart case is plugged in the charging circuit both recharges the case as well as the smartphone battery. The case may also be powered through the USB port analogous to the charging circuit to either power the device and/or charge the case battery.

In another embodiment of the current invention said smart case for the interactive display and broadcast of images, video, and audio respectively from a smartphone may be adapted to use with a tablet.

By utilizing the current protective smart case, a dynamic system of data transfer, multiple external OS control, smartphone pairing, and image/video display is presented to overcome current limitations in smartphone technology.

BRIEF DESCRIPTION OF DRAWINGS

FIG. 4 is a data flow schematic diagram illustrating the data transfer communication.

DETAILED DESCRIPTION OF THE INVENTION

Figure 1:
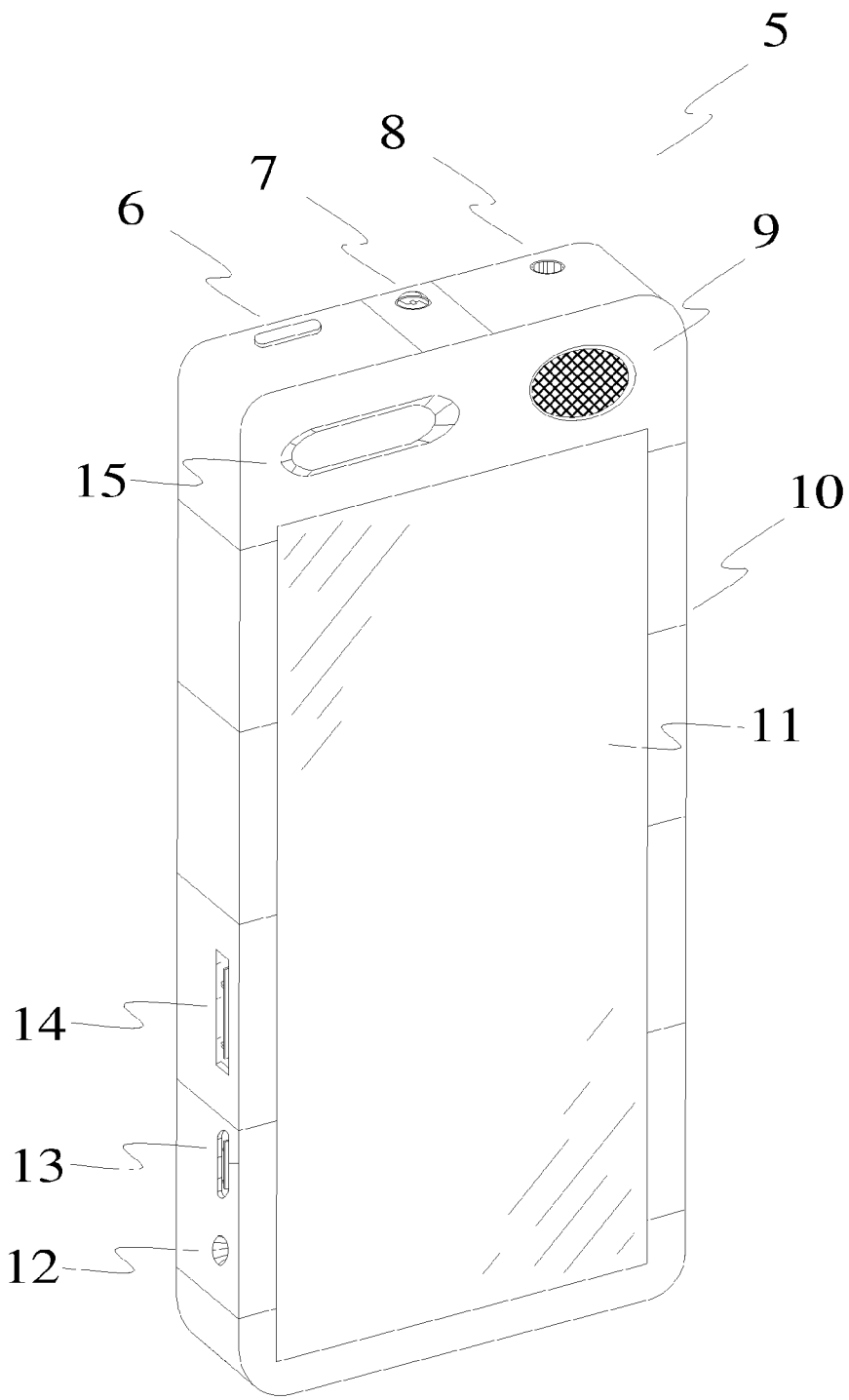
FIG. 1 is a perspective view of the back of the protective smart case.

Referring now to the drawings, and more particularly FIG. 1, the present invention as shown in one embodiment is a perspective view of the back of the protective smart case 5. Said case 5 is formed of hardened plastic with a rubberized coating 10 and may contain a rubberized cap 6 to cover a smartphone power button, a laser pointer 7, a portion defining a hole 8 for a smartphone audio jack, a speaker 9, a capacitive touchscreen display 11, a recharging power port 12, a mini USB port 13, a micro-drive or solid state flash media memory card slot 14, and portions defining a hole for a phone camera 15. Said memory card slot 14, may be adapted to fit a micro drive, compact flash, or SD type non-volitile memory architecture including, but not limited to SDIO, SDHC, SDXC, miniSD, miniSDHC, miniSDXC, microSD, memory stick, memory stick pro, memory stick duo, etc. The coupling of the smart case 5 to a smartphone may come through a physical electronic connector, either 3.5 mm TRRS (RJ11) connector or thirty-pin, a USB 13 connection, through IR (not shown), or through a RF wireless technology such as Bluetooth, TransferJet, UWB, Zigbe, Wi-Fi, and the like. In the present embodiment of the invention Bluetooth and Wi-Fi protocols are used. Specifically Bluetooth 2.0+EDR, 2.1+EDR, v3.0+HS, or Bluetooth v4.0 may be used to work in conjunction with the smartphones Wi-Fi capability.

Figure 2:
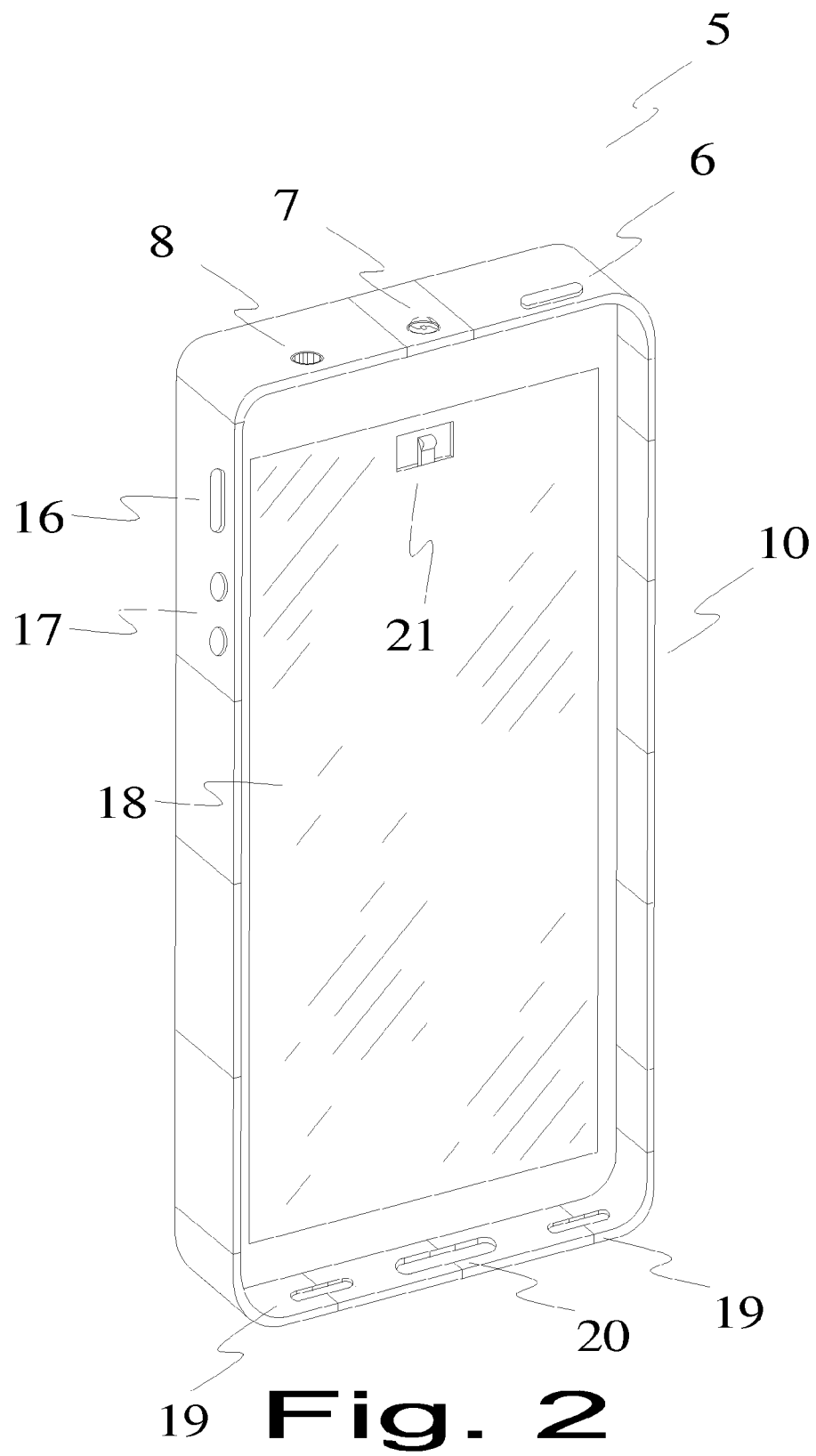
FIG. 2 is a perspective view of the front of the protective smart case.

FIG. 2 shows a perspective view of the front of the protective smart case 5 and may contain portions defining a hole 16 for a smartphone audio on/off button, rubberized smartphone volume button covers 17, a circuitry access panel 18 incorporating a latch 21, portions defining a hole for smartphone speakers 19, and portion defining a hole 20 for a smartphone thirty pin connector.

Figure 3:
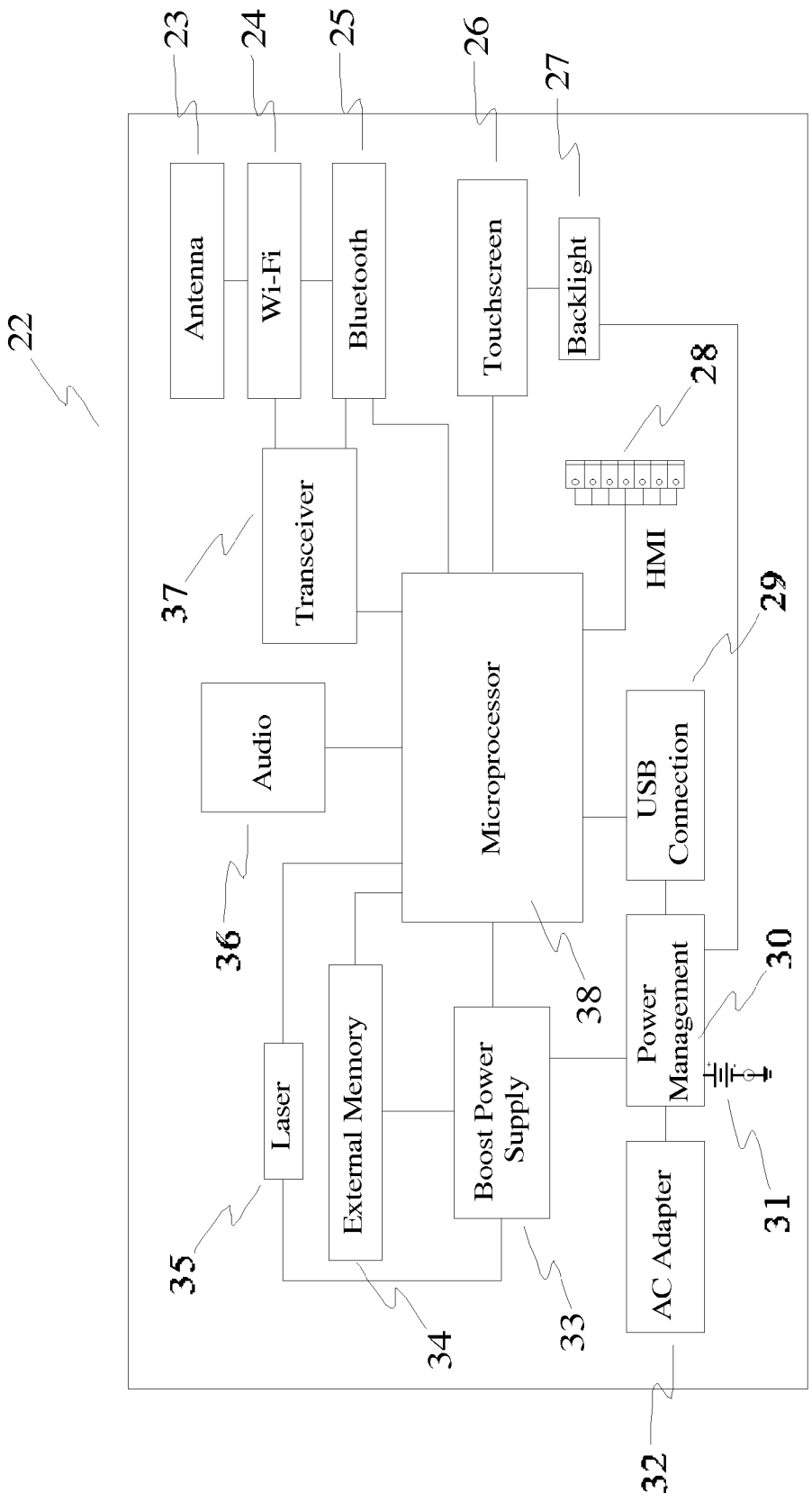
FIG. 3 is an example block diagram of the smart case circuitry.

FIG. 3 shows a block diagram of an example circuitry 22 in which the various circuitry components are connected. Tracing through the circuitry 22, a wireless signal may be absorbed by an internal antenna 23 in which said signal is passed on to either the first wireless network interface Wi-Fi module 24 or the second wireless network interface Bluetooth module 25 depending on the type of signal received. Signals may also be transferred through a human machine interface device (HMI) 28, a USB 29 connection 13 (FIG. 1), or an external memory 34 device such as a micro-drive, compact flash, or SD type card reader 14 (FIG. 1). Signals used for control of a mouse on an external OS are managed by the Bluetooth module 25, while signals used for larger data packets such as images, video, and audio are managed by the Wi-Fi module 24. Both the Wi-Fi module 24 and the Bluetooth module 25 are coupled to the transceiver module 37 so that data may pass through, to and from a LAN/Ethernet port (not shown). The transceiver 37, Bluetooth module 25, and Wi-Fi module 24, are coupled to a microprocessor 38 for execution of stored computer-executable instructions to perform operations. Said stored computer-executable instructions reside in the internal memory of the microprocessor 38, or may come from an external memory 34 source which may include a micro-drive memory card or the internal memory of a coupled smartphone, a USB 29 input, or computer-executable instructions received via the wireless modules 24 and 25. Said microprocessor 38 will then pass data to the coupled touchscreen module 26 for display. The touchscreen module 26 is driven by internal circuitry and backlit by the backlight module 27. The microprocessor is also coupled to an audio driver module 36 to process audio for the various modes of the smart case circuitry 22 operation. A 3-in-1 power boost circuit 33 provides power to all coupled components and is directly coupled to the microprocessor 38, external memory 34, a laser module 35, and a power management circuit 30. Said laser module 35 is also coupled to said microprocessor 38 for operation. The power management circuit 30 is coupled to the AC input module 32, the backlight module 27, the USB 29 input module, and an internal battery 31 such that the device may be powered by the battery 31, a USB 29 connection, or an AC input 32 from a wall outlet or otherwise convertible outlet. The function of the power management circuit 30 is to power the device circuitry 22 via said battery 31, USB 29 connection, or an AC input 32, but also serves to charge said battery 31 when either a USB 29 or AC input 32 is available. The power management circuit 30 may also charge the battery 31 while the device circuitry 22 is in either an "on" or "off" state.

The audio driver module 36 may also control the smart case 5 high capacity neodymium magnet speaker 9, external headphones, an internal or external microphone and may work independently or in sequence with the smartphone speaker(s). The on-board laser 7, powered by the laser module 35 may be a class I through class IIIb diode laser in the visual or IR frequency range with a maximum power up to 300 mW.

FIG. 4 shows a data flow schematic 39 of the path of data to and from the microprocessor 38. In the receiving mode, said schematic 39 begins with a wireless 40 signal from either a Wi-Fi 24 connection, or a Bluetooth 25 connection being passed to the microprocessor 38. Once there, said signal is processed for execution of stored computer-executable instructions to pass the data on to appropriate output. Said output being an audio file processed further through the audio module 36 and sent to the speaker 9 for audible sound. Another data output may be an image or video file processed further through the touchscreen module 26 for display on the touchscreen 11. Additional outputs also include processing of the data by the USB module for transfer to an external device, processing of the data by the internal memory module 41 for storage of said data internally, or processing by the external memory module 33 for transfer to an external memory device such as a micro-device memory card. The converse operation (transmitting mode) is also possible in which transferred or stored data from the internal memory module 41, external memory module 33, or an external USB source 29 may be processed by the respective modules, and then passed onto the microprocessor 38 for further processing. Said data would be either displayed on the touchscreen 11, with or without accompanying sound through the audio module 36 and speaker 9, or passed onto the wireless 40 modules for transmitting to an external device, either smartphone OS or computer OS, through either Bluetooth 25 or Wi-Fi 24. The microprocessor may also act as a flow-through if the user wanted to take a picture (for example) with the smartphone camera, transmit said image to the smart case OS to then wirelessly transmit said image to an external OS or another smartphone.

The best mode of the present invention is an example that incorporates the use of an Apple® iPhone® as the smartphone but in no way is meant to limit the scope of the invention or its various modifications and designs to work with other types and brands of smartphones. Further it is foreseeable that the current invention may be adapted to fit a tablet as well as a smartphone by simply modifying the dimensions of the device.

The various embodiments of the present invention as shown in FIGS. 1-4 may be arranged and designed in a wide variety of different configurations that fall within the scope of the present invention, and may be applied to any type of smartphone system involving the transfer of data to the case LCD and speaker for image and/or video display, and audio broadcast respectively.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

The invention claimed is:

1. A protective smartphone case system for interfacing, acquiring, transferring, broadcasting and displaying data with a smartphone comprising:
    a hardened plastic case with a rubber coating;
    a memory storing computer-executable instructions contained within said hardened plastic case;
    a first processor that facilitates execution of said computer-executable instructions to perform operations, communicatively coupled to both said memory, and a second processor of a connectable smartphone;
    a capacitive touchscreen display module coupled to said first processor for the display of images and video;
    an external memory card reader coupled to said first processor;
    a mini USB data port coupled to said first processor;
    an audio processor communicatively coupled to said first processor for the broadcast of audio data stored in said memory, an external memory source from said external memory card reader, from said mini USB data port or transferred from said second processor of a connectable smartphone;
    a speaker coupled to said audio processor;
    an electrical connector coupled to said first processor to electronically couple a smartphone;
    a power recharging port couples to said first processor;
    a power management circuit coupled to said power recharging port and capacitive touchscreen display module;
    a rechargeable battery coupled to said power management circuit and said first processor;
    a diode laser coupled to said first processor;
    a 3-in-1 power boost coupled to said laser, said memory, said power management circuit and said first processor;
    wherein said capacitive touchscreen display module incorporates a capacitive touchscreen display, circuitry to drive said capacitive touchscreen display, and backlight circuitry to light said capacitive touchscreen display;
    wherein said power management circuit coupled to said power recharging port is further coupled to said mini USB data port; and
    wherein said hardened plastic case with a rubber coating is to further adaptively house said smartphone within itself.

2. The apparatus of claim 1, wherein said diode laser has a maximum power output of 300 mW, of type class I to class IIIb, and is in the visible frequency range of red, green or blue.

3. The apparatus of claim 1, wherein said diode laser has a maximum power output of 300 mW and is in the range of class type I to class IIIb, and is in the IR frequency range.

4. The apparatus of claim 1, wherein said audio processor may also transfer audio data from an external memory source, an external device, an external USB source.

5. The apparatus of claim 1, wherein said protective smartphone case system may be adapted for tablets.

6. A protective cell phone case system for interfacing, acquiring, transferring and displaying data with a smartphone comprising:
- a hardened plastic case with a rubber coating;
- a memory storing computer-executable instructions contained within said hardened plastic case;
- a first processor that facilitates execution of said computer-executable instructions to perform operations, communicatively coupled to both said memory, and a second processor of a connectable external wireless device;
- a capacitive touchscreen display module coupled to said first processor for the display of images;
- an external memory card reader coupled to said first processor;
- a mini USB data port coupled to said first processor;
- an audio processor communicatively coupled to said first processor for broadcast of audio data stored in said memory, an external memory source from said external memory card reader, from said mini USB data port or transferred from said second processor of a connectable external wireless device;
- a speaker coupled to said audio processor;
- a first wireless network interface coupled to said second processor to electronically couple a smartphone and/or external wireless device;
- a second wireless network interface coupled to said second processor to electronically couple a smartphone and/or external wireless device;
- a power recharging port coupled to said first processor;
- a power management circuit coupled to said power recharging port and capacitive touchscreen display module;
- a rechargeable battery coupled to said power management circuit and said first processor;
- a diode laser coupled to said first processor;
- a 3-in-1 power boost coupled to said laser, said memory, said power management circuit and said first processor; and
- wherein said first and second wireless network interface are enabled to communicatively couple to said second processor of a connectable external wireless device;
- wherein said capacitive touchscreen display module incorporates a capacitive touchscreen display, circuitry to drive said capacitive touchscreen display, and backlight circuitry to light said capacitive touchscreen display;
- wherein said power management circuit coupled to said power recharging port is further coupled to said mini USB data port; and
- wherein said hardened plastic case with rubber coating is to further adaptively house said smartphone within itself.

7. The apparatus of claim 6, wherein said first wireless network interface uses a Wi-Fi communication protocol architecture.

8. The apparatus of claim 6, wherein said second wireless network interface uses a Bluetooth communication protocol architecture.

9. The apparatus of claim 6, wherein said first wireless network interface and said second wireless interface uses an RF (Radio Frequency), SMS (Short Message Service), Wi-Fi, Bluetooth, TransferJet, Zigbee, or UWB (Ultra-wideband), architecture.

10. The apparatus of claim 6, wherein said diode laser has a maximum power output of 300 mW, of type class I to class IIIb, and is in the visible frequency range of red, green or blue.

11. The apparatus of claim 6, wherein said diode laser has a maximum power output of 300 mW and is in the range of class type I to class IIIb, and is in the IR frequency range.

12. The apparatus of claim 6, wherein said protective smartphone case system may be adapted for tablets.

13. A protective cell phone case system for interfacing, acquiring, transferring and displaying data with a smartphone comprising:
- a hardened plastic case with a rubber coating;
- a memory storing computer executable instructions contained within said hardened plastic case;
- a first processor that facilitates execution of said computer-executable instructions to perform operations, communicatively coupled to both said memory, and a second processor of an external wireless device;
- a capacitive touchscreen display module coupled to said first processor for the display of images;
- an external memory card reader coupled to said first processor;
- a mini USB data port coupled to said first processor;
- an audio processor communicatively coupled to said first processor for broadcast of audio data stored in said memory, an external memory source from said external memory card reader, from said mini USB data port or transferred from said second processor of a connectable external wireless device;
- a speaker coupled to said audio processor;
- a first wireless means coupled to said second processor to electronically couple an external wireless device;
- a second wireless means coupled to said second processor to electronically couple an external wireless device;
- a power recharging port coupled to said first processor;
- a power management circuit coupled to said power recharging port and capacitive touchscreen display module;
- a rechargeable battery coupled to said power management circuit and said first processor;
- a diode laser coupled to said first processor;
- a 3-in-1 power boost coupled to said laser, said memory, said power management circuit and said first processor; and
- wherein said first and second wireless means are enabled to communicatively couple to said second processor of a connectable external wireless device;
- wherein said capacitive touchscreen display module incorporates a capacitive touchscreen display, circuitry to drive said capacitive touchscreen display, and backlight circuitry to light said capacitive touchscreen display;
- wherein first and second wireless means are Bluetooth, Wi-Fi, and SMS (Short Message Service) enabled;
- wherein said power management circuit coupled to said power recharging port is further coupled to said mini USB data port; and
- wherein said hardened plastic case with rubber coating is to further adaptively house said smartphone within itself.

14. The apparatus of claim 13, wherein said first wireless network interface uses a Wi-Fi communication protocol architecture.

15. The apparatus of claim 13, wherein said second wireless network interface uses a Bluetooth communication protocol architecture.

16. The apparatus of claim 13, wherein said first wireless network interface and said second wireless interface uses an RF (Radio Frequency), SMS, Wi-Fi, Bluetooth, TransferJet, Zigbee, or UWB (Ultra-wideband), architecture.

17. The apparatus of claim 13, wherein said diode laser has a maximum power output of 300 mW, of type class I to class IIIb, and is in the visible frequency range of red, green or blue.

18. The apparatus of claim 13, wherein said diode laser has a maximum power output of 300 mW and is in the range of class type I to class IIIb, and is in the IR frequency range.

19. The apparatus of claim 13, wherein said protective smartphone case system may be adapted for tablets.

\* \* \* \* \*